Patented Feb. 26. 1929.

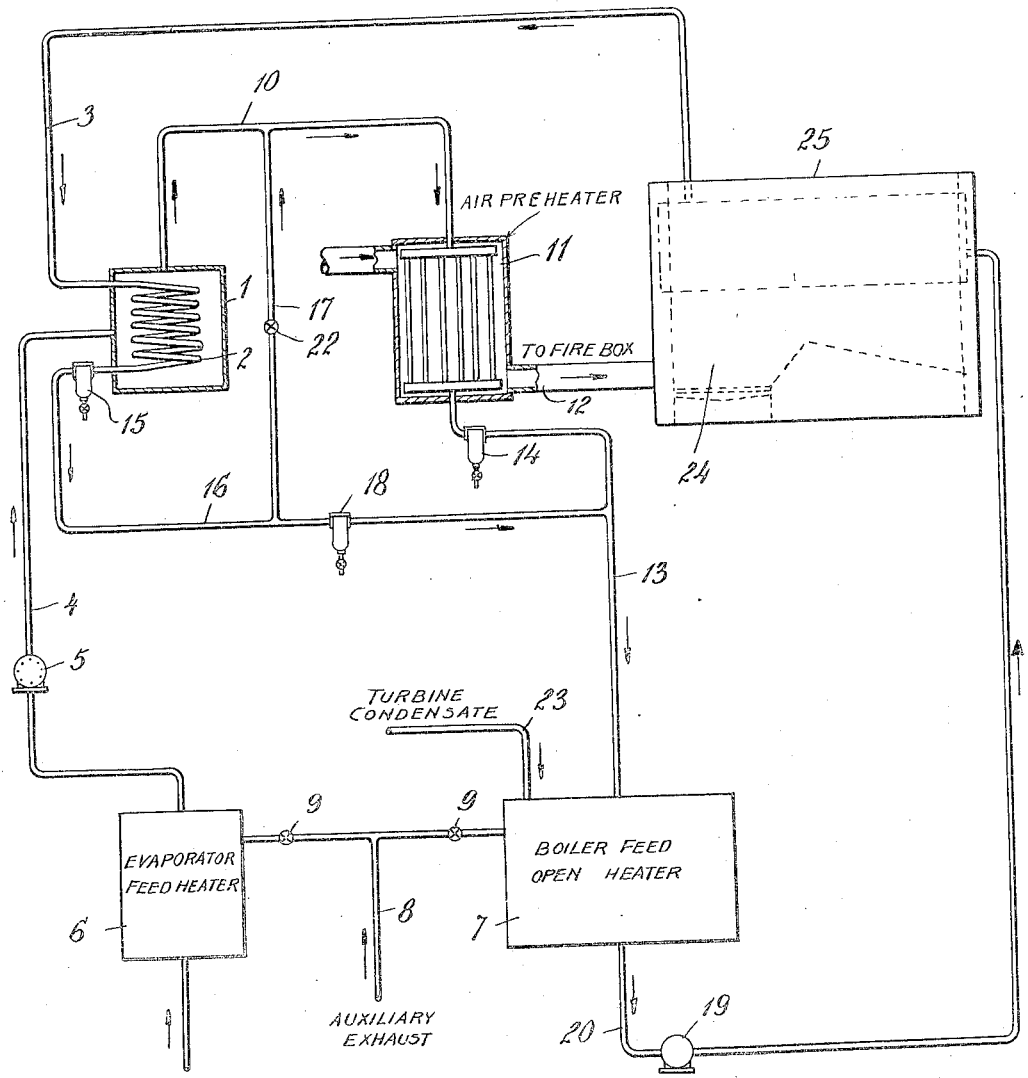

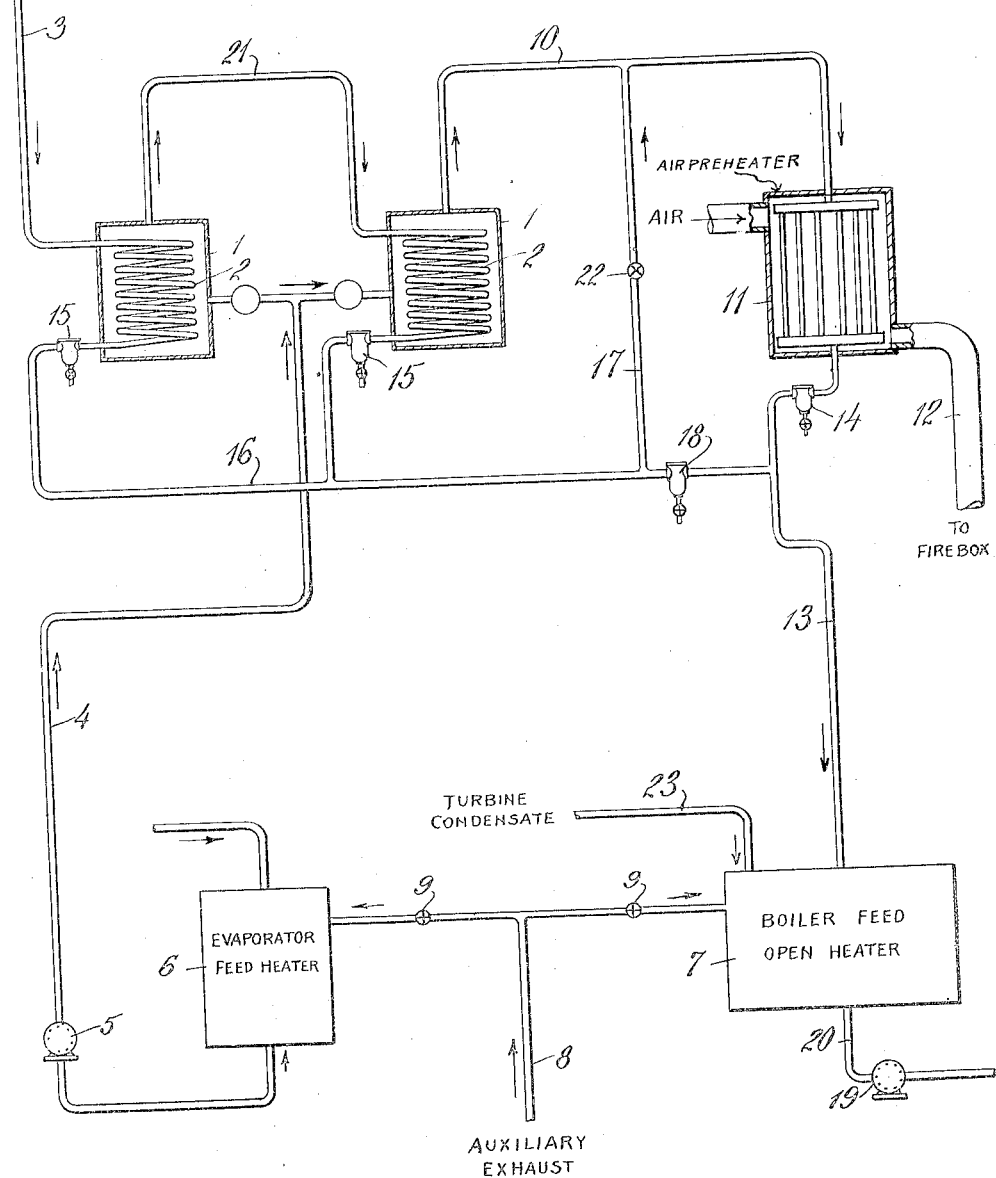

1,703,093

UNITED STATES PATENT OFFICE.

STANLEY BROWN, OF GARDEN CITY, NEW YORK, ASSIGNOR TO THE GRISCOM RUSSELL COMPANY, OF NEW YORK, N. Y., A CORPORATION OF DELAWARE.

EVAPORATOR AND PREHEATER SYSTEM.

Application filed September 16, 1921, Serial No. 501,176. Renewed January 12, 1928.

The present invention relates to utilization of the available heat contained in the evaporator output of a steam plant, and has particular reference to plants in which the evaporator heat returns cannot be completely or conveniently absorbed by the boiler feed water.

In the design of steam plants particular attention must be paid to obtaining a proper heat balance. In order to secure a high over all efficiency it is necessary that practically all the available heat in the exhaust steam turbine condensate, etc., be returned to the system. This problem assumes particular importance in plants whose water supply must be purified by an evaporator system before it is fit for use in the boilers, since the large amount of heat contained in the evaporator output frequently cannot be absorbed in the plant open heater. It is difficult and costly to provide a system of pressure condensers for satisfactorily absorbing this heat under varying conditions of load.

Heretofore various apparatus have been designed for utilizing the available heat in the exhaust steam and evaporator output by transmitting this heat to the feed water on its way to the boiler. It has also been proposed to employ exhaust steam evaporators for supplying the boiler make-up without disturbing the heat balance of the system, since the exhaust steam used as heating medium in the evaporator would otherwise have gone directly to the boiler feed open heater and the evaporator output does not increase the amount of heat delivered to the heater. Such evaporators are, however, necessarily larger and more expensive than high pressure evaporators and are necessarily limited to small percentage make-up, and in addition have the disadvantage inherent in all vacuum apparatus that air is likely to leak into the system and increase the amount of oxygen dissolved in the boiler water.

In the calculation of a true heat balance for a steam plant the destination of each heat unit actually supplied in the fuel used to fire the boiler must be taken into consideration. The boiler water is heated by the influence of hot gases from the combustion chamber, and the oxygen necessary for combustion is invariably furnished by supplying a sufficient quantity of air to the fire box. The heat of combustion is directly utilized in raising the temperature of the gases in the combustion chamber. It follows that a higher temperature may be obtained from a given combustion process if the air is heated by some external means before it is admitted to the fire box, since the total heat available in the fire box will then be the heat of combustion plus the heat which is added externally.

It is accordingly a principal object of my invention to provide a high pressure evaporator system embodying all the advantages common in such a system and which at the same time has the additional advantages of not disturbing the heat balance as calculated for the boiler feed system.

It is also an object of the invention to provide a sytem for use in steam plants in which a large part of the available heat in the evaporator output is utilized by imparting it to air on its way to the combustion chamber.

It is a still further object to provide a convenient and inexpensive system which efficiently utilizes the available heat in the discharge from the evaporator and from the various steam utilizing apparatus employed in connection with the plant without the use of high pressure heaters or other expensive apparatus.

I have illustrated a preferred embodiment of my invention in the accompanying drawings, in which Fig. 1 is an illustration, largely diagrammatic, of my invention as applied to a typical power plant layout embodying a single effect evaporator; and Fig. 2 is a similar view illustrating a plant which employs a multi-effect evaporator system.

Referring to Fig. 1, 1 indicates the shell of the evaporator effect which is provided for supplying purified water to the boiler. The heating coil 2 of the evaporator receives its steam supply directly from the boiler through the line 3 and the evaporator is fed with raw water through a line 4 containing a pump 5, an open heater 6 being provided to preheat the raw water before it is delivered to the evaporator shell. The evaporator open heater 6 as well as the boiler feed open heater 7 receive as their heating medium through line 8 exhaust steam as it comes from the various engines and other steam utilizing apparatus employed in conjunction with the plant, valves 9 being provided to regulate the relative quantity of steam delivered to the respective heaters.

Vapor from the evaporator is conducted by means of a line 10 directly to a preheater 11, where it serves as a heating medium for air delivered to the combustion chamber under the boiler. This preheater contains a passage for the working fluid delivered through line 10 and a second passage in heat exchanging proximity therewith for the air, and may be of any particular construction desired. Air is drawn through the heater by means of a fan or natural draught, and is conveyed directly to the fire box 24 furnishing the heat for operating the boiler 25 through the air line 12. The discharge line 13 leading from the preheater 11 is provided with a trap 14 designed to effect complete condensation of the vapor in the heater by allowing only condensed liquid to be discharged. The vapor chambers of the veaporator and the preheater are thus in direct communication and are maintained at substantially the same temperature and pressure.

Steam is supplied to the heating coil 2 of the evaporator effect at relatively high pressure, and a trap 15 is provided in the coil drain line 16 for the purpose of preventing discharge of uncondensed steam from the coil tube and thus insuring complete condensation of the steam at the conditions of pressure and temperature prevailing within the heating coil. The discharge line 16 may open directly into boiler feed heater 7 which is usually vented to atmosphere and is therefore maintained at or about atmospheric pressure or line 13, which is also at substantially atmospheric pressure, in which case the liquid from the trap 15 will be discharged into a region substantially at atmospheric pressure. Since the pressure within the heating coil 2 is materially above atmospheric a violent ebullition or flashing will occur when the liquid from the trap is discharged into the low pressure line. The flash vapor thus formed is due to the excess of sensible heat contained in the liquid discharged from the coil 2 at the higher pressure existing in the coil above that which it contains at atmospheric pressure, that is, at the pressure of heater 7 or line 13. This flash steam together with the condensed liquid at substantially atmospheric boiling point, is delivered directly to the open heater 7. The discharge from trap 14 is also delivered as heating medium to the open heater 7. But little flash vapor is formed from the discharge from trap 14, however, since the preheater 11 is preferably designed to operate at or near atmospheric pressure. The main body of the feed delivered to the open heater 7 usually consists largely of turbine condensate at a temperature of about 70°, and is conducted into the heater through line 23.

This arrangement is satisfactory for many installations, but in some cases the amount of available heat delivered to the open heater is sufficiently great to cause the feed water to boil, with a resulting loss of heat. To accommodate such a situation a branch line 17 may be provided leading from the drain line 16 to the vapor line 10, a trap 18 being provided in the drain line beyond its junction with the branch line 17. With such an arrangement, the portion of the drain line between traps 15 and 18 will be at substantially the same pressure as the evaporator shell, and a considerable amount of flash steam will be generated upon discharge of the condensate from coil 2 into the line 16. Such steam is free to pass up through the line 17 to the preheater 11, along with the vapor from the evaporator where it is condensed, imparting its latent heat to air on the way to the fire box. Traps 14 and 18 then discharge directly into the open heater 7, and the small quantity of available heat in these low temperature drains is imparted to the boiler feed water. A pump 19 is provided in the line 20 to deliver feed water to the boiler.

I have found that such a system embodying my invention is particularly adapted for the typical make up requirement for a single effect arrangement. With a boiler feed makeup of 5% and the entire vapor from the evaporator effect condensed in the air preheater 11, I have found that the air passing through the preheater is imparted a temperature rise of from 110° to 120°.

When a greater percentage make up is required it is often desirable to incorporate my invention in a multieffect system. A two-effect system is illustrated in Fig. 2, the shells of both effects being supplied with raw water directly from the evaporator open heater 6 heated by the exhaust from the various steam utilization apparatus of the plant. The heating coil of the first effect is supplied with steam directly from the boiler through a line 3, while the heating coil of the second effect is fed through line 21 with vapor from the first effect. The pressure and temperature of the second effect are thus correspondingly lower than in the first effect. A vapor line 10 leads directly from the shell of the second evaporator effect to the air preheater 11.

A common drain line 16 is provided for receiving the drains from the heating coils of both effects, the discharge line of each coil containing a trap 15. A branch line 17 is preferably provided between the drain line 16 and the steam line 10, a trap 18 being placed in the drain line 16 beyond its junction with the pipe 17. This section of the piping intermediate the traps 15 and 18 is in direct communication thru lines 10 and 17 with the vapor space of the evaporator, and is therefore at substantially the same pressure as is the evoparting vapor space. The pressure in this section of piping is considerably lower than the pressure in the heating coil 2 and therefore the contained heat in the liquid discharged from trap 15 will vaporize a portion of the liquid upon its admission to the region of lower pressure in line 16, and a quantity of flash steam will be formed. The flash steam arising from the discharge traps 15 may thus be joined with the vapor from the last evaporator effect and sent directly to the preheater 11, the quantity of flow from the traps being regulated by means of a valve 22 placed in the branch line. The discharge from the trap 18 and from the preheater 11 is sent as before to the boiler feed heater 7.

While I have illustrated a single effect system and a double effect system, I may employ any number of effects desirable, the coil drains of the various effects preferably being joined in a common drain line and provisions being made for uniting the flash steam resulting from the discharge of these drains with the vapor from the last evaporator effect, for the purpose of passing these combined vapors into the air preheater.

According to my invention it is always possible to supply to the boiler feed open heater the maximum amount of heat which may be accommodated and utilize the remaining available heat from the system in the air preheater. Since any rise in temperature of the air delivered to the fire box is beneficial, in that such temperature rise will not have to be imparted to it during the process of combustion, the exact temperature rise occuring in the preheater itself is of no material importance. The preheater is thus capable of efficiently accommodating any surplus of heat over that which may be utilized in the boiler feed system. This feature of my invention makes it particularly advantageous for use in plants where the amount of available return heat from the system is greater than can be utilized in an open heater. It is also of particular value in applying an evaporator system to a plant already operating without evaporators or in which the heat balance for the system has been calculated entirely apart from consideration of the heat made available in the evaporator output.

I have found that my invention may readily be applied to a steam generating plant without materially increasing the temperature in the boiler feed open heater and, by absorbing the heat from the evaporator output in the air passed to the fire box, an overall efficiency as high as that of a high heat level evaporator system may be obtained.

I have illustrated my invention as applied to a typical power plant layout, but it is to be understood that various changes in the details of construction may be made without departing from the spirit of the invention. For instance, in certain installations it may be desirable that none of the drains from the evaporator system be returned to the plant open heater. In such a case the drain line 13 instead of discharging into the open heater would be connected to the boiler feed line at some point in the circuit beyond the feed pump 19. Thus the available heat from the evaporator system would be completely utilized without in any way disturbing the heat balance of the system. Further changes may be made within the full scope of the appended claims.

I claim:

1. In a steam generating system comprising a high pressure boiler and a combustion chamber therefor, an evaporator connected with the steam space of the high pressure boiler, means for supplying feed water to said evaporator in heat exchange relation with said high pressure steam, a heat exchanger, means for conducting the vapor of said feed water from said evaporator to said heat exchanger, means for passing air on its way to the combustion chamber, through said heat exchanger in heat exchanging relation with the vapor therein, a boiler feed open heater communicating with said high pressure boiler and means for delivering the condensate from said heat exchanger to said feed heater.

2. In a steam generating system comprising a high pressure boiler and a combustion chamber therefor, an evaporator connected with the steam space of the high pressure boiler, means for supplying feed water to said evaporator in heat exchange relation with said high pressure steam, a heat exchanger, means for conducting the vapor of said feed water from said evaporator to said heat exchanger, means for passing air on its way to the combustion chamber, through said heat exchanger in heat exchanging relation with the vapor therein, a boiler feed open heater communicating with said high pressure boiler and means for delivering the condensate from said heat exchanger and from the heating chamber of said evaporator to said feed heater.

3. In a steam generating system comprising a boiler and a combustion chamber therefor, an evaporator connected with the steam space of the boiler, means for supplying feed water to said evaporator in heat exchange relation with said steam, a heat exchanger, means for conducting the vapor of said feed water from said evaporator to said heat exchanger, means for passing air on its way to the combustion chamber, through said heat exchanger in heat exchanging relation with the vapor therein, a boiler feed open heater communicating with said boiler, and means for joining the condensate from the heating chamber of said evaporator with the condensate from said heat exchanger and conducting said joined fluids into said feed heater.

4. In a steam generating system comprising a boiler and a combustion chamber therefor, an evaporator connected with the steam space of the boiler, means for supplying feed water to said evaporator in heat exchange relation with said steam, a heat exchanger, means for conducting the vapor of said feed water from said evaporator to said heat exchanger, means for subjecting the condensate from the heating chamber of said evaporator to a lower pressure, thereby causing a portion of said condensate to be vaporized by its contained heat, means for joining the resulting vapor with the vapor from the vaporization chamber of said evaporator and conducting said joined vapors into the heat exchanger, means for passing air on its way to the combustion chamber, through said heat exchanger in heat exchanging relation with the vapor therein, a boiler feed open heater communicating with said boiler and means for delivering the condensate from said exchanger to said feed heater.

5. In a steam generating system comprising a boiler and a combustion chamber therefor, an evaporator connected with the steam space of the boiler, means for supplying feed water to said evaporator in heat exchange relation with said steam, a heat exchanger, means for conducting the vapor of said feed water from said evaporator to the heat exchanger, means for subjecting the condensate from the heating chamber of the evaporator to a lower pressure, thereby causing a portion of said condensate to be vaporized by its contained heat, means for joining said vaporized portion with the vapor from the vaporization chamber of said evaporator and conducting the joined vapors into the heat exchanger, means for passing air on its way to the combustion chamber through said heat exchanger in heat exchanging relation with the vapor therein, a boiler feed heater communicating with said boiler and means for joining the liquid portion of the condensate from the heating chamber of the evaporator with the condensate from the heating space of the heat exchanger and conducting the joined fluids to said feed heater.

6. In a steam generating system comprising a boiler and a combustion chamber therefor, an evaporator connected with the steam space of the boiler, means for supplying feed water to said evaporator in heat exchange relation with said steam, a heat exchanger, means for conducting the vapor of said feed water from said evaporator to said heat exchanger, means for subjecting the condensate from the heating chamber of the evaporator to a lower pressure, thereby causing a portion of said condensate to be vaporized by its contained heat, means for joining a regulatable part of the resulting vapor with the vapor from the vaporization chamber of said evaporator and conducting the joined vapors into the heat exchanger, means for passing air on its way to the combustion chamber, through said heat exchanger in heat exchanging relation with the vapor therein, a boiler feed heater communicating with said boiler and means for delivering the condensate from the heat exchanger to said feed heater.

7. In a steam generating system comprising a boiler and a combustion chamber therefor, an evaporator connected with said system and adapted to receive steam therefrom, means for supplying feed water to said evaporator in heat exchange relation with said steam, a heat exchanger, means for conducting the vapor of said feed water from said evaporator to said heat exchanger, means for passing air on its way to the combustion chamber, through said heat exchanger in heat exchanging relation with the vapor therein, a boiler feed heater communicating with said boiler and means for delivering the condensate from said heat exchanger to said feed heater.

8. In a steam generating system comprising a boiler and a combustion chamber therefor, an evaporator connected with said system and adapted to receive steam therefrom, means for supplying feed water to said evaporator in heat exchange relation with said steam, a heat exchanger, means for conducting the vapor of said feed water from the evaporator to said heat exchanger, means for passing air on its way to the combustion chamber, through said heat exchanger in heat exchanging relation with the vapor therein, a boiler feed heater communicating with said boiler and means for delivering the condensate from said heat exchanger and from the heating chamber of said evaporator to said feed heater.

9. In a steam generating system comprising a boiler and a combustion chamber therefor, an evaporator connected with said system and adapted to receive steam therefrom, means for supplying feed water to said evaporator in heat exchange relation with said steam, a heat exchanger, means for conducting the vapor of said feed water from said evaporator to said heat exchanger, means for passing air on its way to the combustion chamber through said heat exchanger in heat exchanging relation with the vapor therein, a boiler feed heating system including a boiler feed heater communicating with said boiler, and means for delivering the condensate from said heat exchanger to said boiler feed heating system.

10. In a steam generating system comprising a boiler and a combustion chamber therefor, an evaporator connected with said system and adapted to receive steam therefrom, means for supplying feed water to said evaporator in heat exchange relation with said steam, a heat exchanger, means for conducting the vapor of said feed water from said evaporator to said heat exchanger, means for passing air on its way to the combustion chamber through said heat exchanger in heat exchanging relation with the vapor therein, a boiler feed system including a boiler feed heater communicating with said boiler, and means for delivering the condensate from said heat exchanger to said boiler feed system.

In testimony whereof I affix my signature.

STANLEY BROWN.